United States Patent Office 3,751,356
Patented Aug. 7, 1973

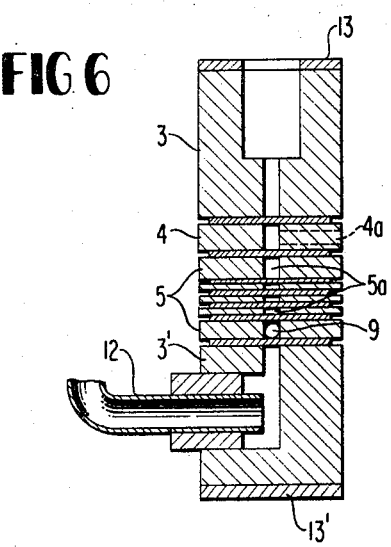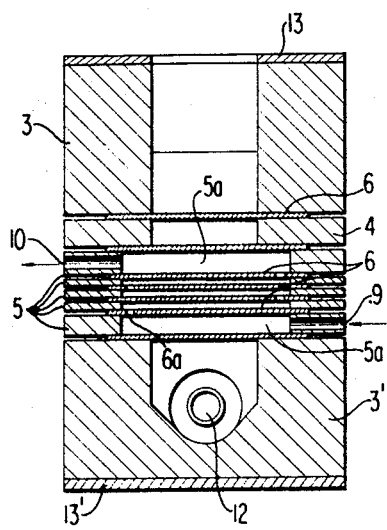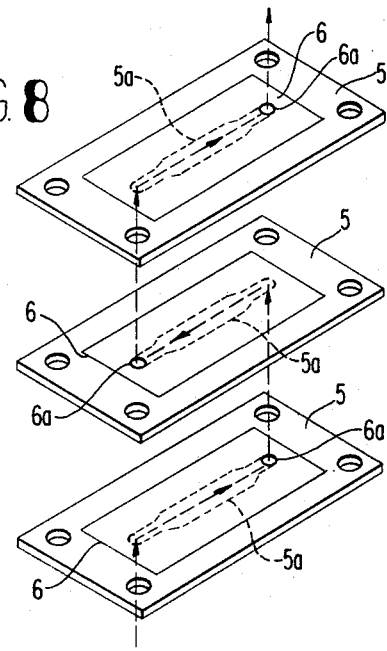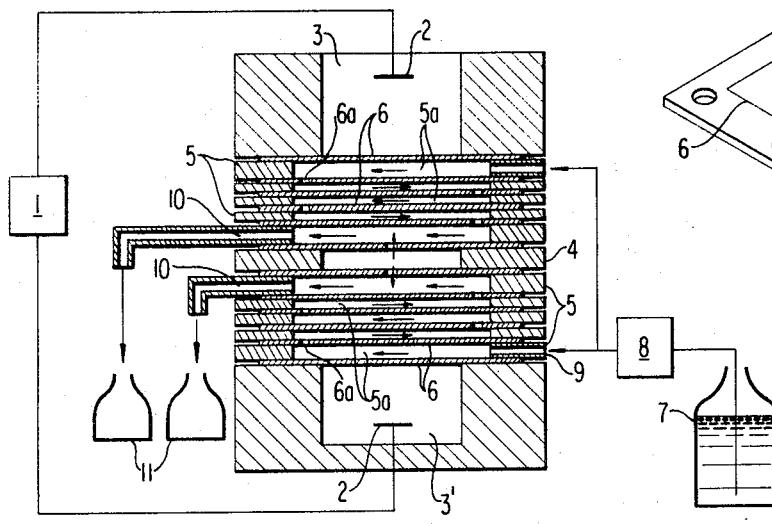

3,751,356
METHOD AND APPARATUS FOR ELECTROEXTRACTION
Yasumitsu Takeya and Nobutaka Tsunakawa, Tokyo, Japan, assignors to Daiichi Seiyaku Co., Ltd., Chuo-ku, Tokyo, Japan
Filed Dec. 22, 1970, Ser. No. 100,730
Int. Cl. B01d 13/02
U.S. Cl. 204—299                4 Claims

ABSTRACT OF THE DISCLOSURE

A method of electroextraction which comprises the steps of placing a sample into a sample chamber, simultaneously filling said chamber and two electrode vessels with a carrier solution, applying a voltage between the electrodes in such a manner that the test component flows through a multistage separation chamber, and supplying a carrier solution into the multistage separation chamber to extract the test component from the sample chamber through a dialysis membrane into the multistage separation chamber, then to an outlet. The electroextraction apparatus utilized in this process comprises a D.C. power supply, positive and negative electrodes connected to the power supply, two electrode vessels each containing an electrode, a sample chamber adjacent to one of the electrode vessels and separated therefrom by a dialysis membrane, a multistage separation chamber disposed adjacent to the sample chamber and between the sample chamber and the other electrode vessel, each stage being separated from the adjacent stage by dialysis membranes with a port provided in the membranes between each stage with the multistage separation chamber being separated from the sample chamber on the one side and the other electrode vessel on the other side by dialysis membranes, a source of carrier solution, a constant flow pump for feeding the carrier solution into the multistage separation chamber, and an outlet from the multistage separation chamber.

BACKGROUND OF THE INVENTION

Field of the invention

This invention relates to a method and apparatus for electroextraction.

Description of the prior art

Heretofore, it has been difficult to extract a test component from pharmaceutical preparations, biological specimens, or crude drugs by conventional extracting means, and it has also been difficult to automatically extract the test component from another sample in an automatic analyzing device.

The present invention solves the diffiulties of the conventional methods and devices and provides a novel and improved method and apparatus for electroextraction.

It is therefore an object of the present invention to provide a method for electroextraction by which one may extract a test component from pharmaceutical preparations, biological specimens, crude drugs, etc.

It is another object of the present invention to provide an electroextraction apparatus which is used to perform the method of this invention.

It is a further object of this invention to provide a method and apparatus for automatically extracting a test component from a sample.

SUMMARY OF THE INVENTION

According to one aspect of the present invention, there is provided a method of electroextraction which comprises placing a sample into a sample chamber, simultaneously filling said chamber and two electrode vessels with a carrier solution, applying a voltage between the electrodes in such a manner that the test component flows through a multistage separation chamber, and supplying a carrier solution into the multistage separation chamber to extract the test component from the sample chamber through a dialysis membrane into the multistage separation chamber.

According to another aspect of the present invention, there is provided an apparatus for electroextraction which comprises a D.C. power supply, positive and negative electrodes connected to the power supply, two electrode vessels each containing an electrode, a sample chamber adjacent to one of the electrode vessels and separated therefrom by a dialysis membrane and between the sample member and the other electrode vessel with the multistage separation chamber being separated from the sample chamber on the one side and from the other electrode vessel on the other side by dialysis membranes, each stage being separated by a dialysis membrane from each other stage with a port provided in the membranes connecting adjacent stages, a source of carrier solution, means (e.g., a constant flow pump) for feeding the carrier solution from the source of carrier solution into the multistage separation chamber, and an outlet from the multistage separation chamber.

BRIEF DESCRIPTION OF THE DRAWINGS

FIG. 6 is a partial sectional view of the apparatus taken along the line X—X in FIG. 4;

FIG. 7 is a partial sectional view of the apparatus taken along the line Y—Y in FIG. 5;

FIG. 8 is an exploded perspective view of a portion of the apparatus of the present invention; and FIG. 9 is a schematic sectional view of another embodiment of the apparatus of this invention.

DETAILED DESCRIPTION OF THE PREFERRED EMBODIMENTS

Figure 1:
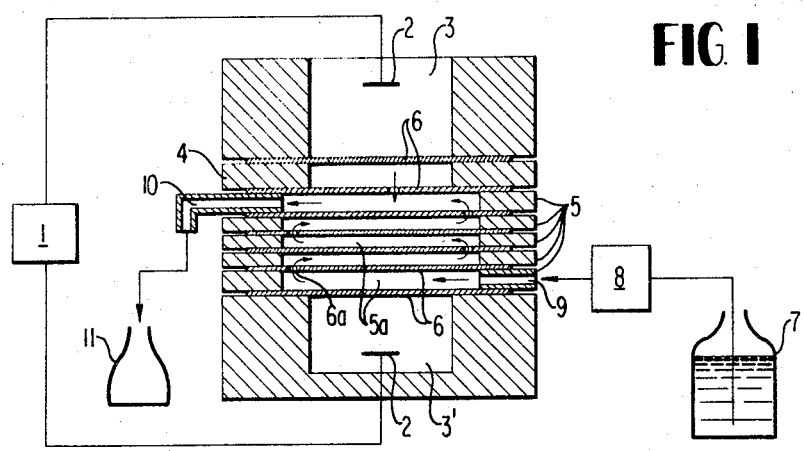
FIG. 1 is a schematic sectional view of one embodiment of the apparatus of the present invention.

In the drawings, like reference numerals refer to like parts.

Referring now to the drawings, and particularly to FIG. 1, which shows an embodiment of the present invention, the arrangement illustrated comprises a D.C. power supply 1, two electrode chambers or vessels 3 and 3', each containing an electrode 2, a sample chamber 4 adjacent to one of the electrode vessels 3 separated from electrode vessel 3 by a dialysis membrane 6, and a plurality of, or at least two, separation chambers 5 adjacent to the sample chamber 4, separated by dialysis membranes 6 from the electrode vessel 3' on one side and from the sample chamber 4 on the other side. The chamber 5 comprises a plurality of superimposed passages 5a connected to each other through ports 6a in the membranes. Also illustrated is a source of carrier solution or carrier solution tank 7, means (e.g., a constant flow pump) 8 for feeding the carrier solution from the source or tank 7 into the multistage separation chamber 5 through inlet port 9, an elutrient outlet 10 from the multistage separation chamber 5, and a receiver 11 for accumulating the elutrient of the automatic analyzer system.

The electroextraction method of this invention comprises placing a sample such as a liquid, powder, crude ground product, etc., into the sample chamber 4 and simultaneously filling said chamber and the electrode vessels 3 and 3' with a carrier solution, and applying a voltage from the D.C. power supply 1 to the electrodes 2 in such a manner that the test component to be extracted separates from the sample chamber 4 through the dialysis membrane 6 into the multistage separation chamber 5 as shown by the vertical arrow in FIG. 1. A constant supply of carrier solution is provided by means of the constant flow pump 8 from the carrier solution tank 7 into the multistage separation chamber 5 through inlet 9. The supplied carrier solution travels through the passages 5a of the multistage separation chamber 5 into the passage 5a adjacent to the sample chamber 4. The test component in the sample is extracted from the sample chamber 4 by the load voltage which is applied between the electrodes 2 from the D.C. power supply 1. The test component passes through the dialysis membrane 6, into the outlet 10 of the multistage separation chamber 5 and into the receiver 11 along with the carrier solution. Thus, the test component is separated from the sample. The elutrient can be used as a sample for analysis, or otherwise properly treated.

In the aforementioned embodiment of the apparatus, the superimposed passages 5a of the multistage separation chamber 5 act in a manner which prevents the direct diffusion of the separated component into the electrode vessel in the separating direction and prevents direct contact with the electrode. Accordingly, the disposition of the ports 6a, the number of superimposed layers in the multistage separation chamber, or the length and shape of passages 5a may be altered in design within the scope of the present invention.

One specific example of this invention is given hereinbelow.

(A) Sample

An acrinol base (63.3 mg.) was dissolved in distilled water to form a 25 ml. solution which was applied to and uniformly mixed with 25 g. of fine crystralline cellulose. After mixing, the mixture was dried for one hour at 60° C. and pulverized in a mortar such that it could be sieved by a 100 mesh sieve to form a sample.

(B) Extracting operation 100 mg. of the sample was placed in sample chamber 4 of the apparatus, and 0.5 N acetic acid was added as a carrier solution to sample chamber 4 and electrolyte vessels 3 and 3'.

The electrodes 2 were positioned in such a manner that the acrinol base to be extracted could move from the sample chamber 4 into the multistage separation chamber 5. The carrier soltuion was forced through the separation chamber by means of a constant flow pump 8 at a flow rate of 1.54 ml. per minute through inlet 9, whose cross-sectional area is approximately 2 mm. $\phi$. The supply rate of the carrier solution was selected such that the test component could not move into the electrode vessel disposed in the separating direction. The electric current employed was 20 ma./cm.$^2$ for a period of 40 minutes.

(C) Extraction rate

Figure 2:
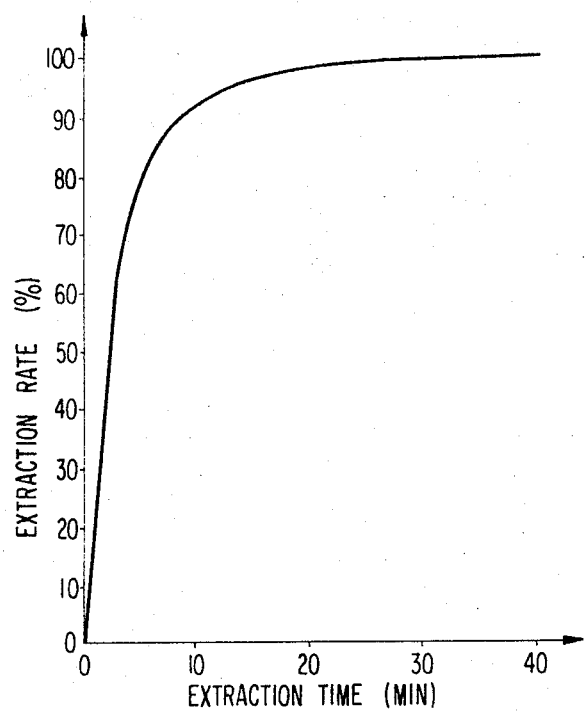
FIG. 2 is a graphical representation of the relationship between the rate of extraction and the time of extraction for one embodiment of the present invention.
Figure 3:
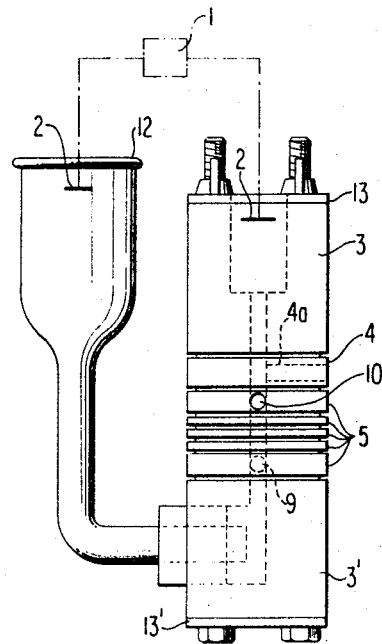
FIG. 3 is a side view of the apparatus of this invention.
Figure 4:
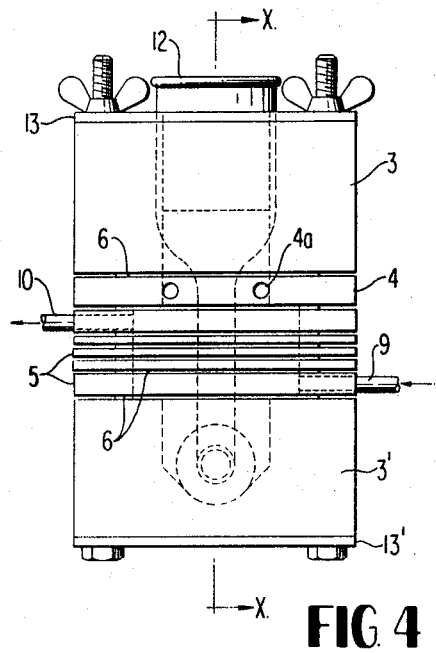
FIG. 4 is a front view of the apparatus of this invention.
Figure 5:
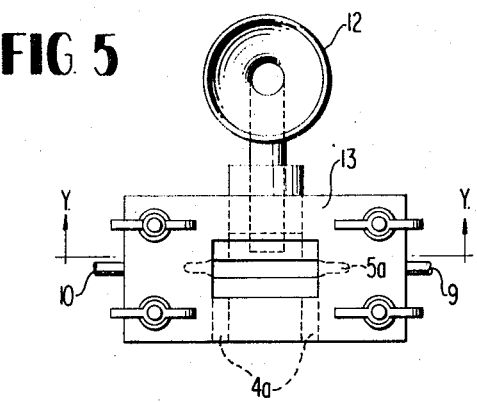
FIG. 5 is a plane view of the apparatus of this invention.

FIG. 2 shows the relationship between the extracting rate and the extracting time of the test component in the above example. A comparison of the result obtained in the aforementioned experiment with the conventional extracting rate will be here inafter described:

In the conventional extracting method, 60 ml. of 0.5 N acetic acid was added to 100 mg. of the sample, shaken and thereafter centrifugally separated. The concentration of acrinol in the supernatant solution was determined so that the rate of extraction could be calculated.

|  | Extracting rate, percent | |
| --- | --- | --- |
| Volume of eluent | This invention (60 ml.) | Conventional method (60 ml.) |
| Extracting time: | | |
| 10 min | | 85.9 |
| 20 min | | 85.6 |
| 30 min | | 85.9 |
| 40 min | 100 | 86 |

D. The membranes used in the aforementioned example comprised cellulose tubing manufactured by the Visking Company. Its thickness is between 0.025–0.09 mm., and its pore size is about 24 A. In the conventional extraction method, after more than 10 minutes, the extracting rate is approximately 86 percent. In the extraction method of the present invention, the extraction rate is approximately 100 percent after 40 minutes of extracting time, as shown in the graph in FIG. 2.

According to the method of this invention, as in the case of the lactic acid salt of acrinol described above, various salt exchange reactions can readily be accomplished in one application of the method of this invention. It follows that the acrinol-lactic acid salt may be obtained as a desired salt of an acid such as, for example, acetic acid salt, by using acetic acid as the carrier solution, together with the extraction operation.

A salt exchange, with respect to a salt of an acid, similar to an acid salt of a base can also be achieved. For example, if an ammonium salt of an organic carboxylic acid is added using the alkaline aquaues solution, having a desired cation as the carrier solution, the desired salt of the organic carboxylic acid is obtained. Thus, the present invention provides a readily practicable method of salt exchange treatment without any loss of the sample. Salt exchange treatments usually require complicated steps and result in many sample losses.

The dialysis membranes are preferably selected depending upon the size and the molecular weight of the test components as follows:

(a) Millipore filter (trademark)
(b) Gelmans membrane filter (trademark)
(c) Sartoruis membrane filter (trademark)
(d) and others.

Any pharmaceutical agent may be used as the test component if it dissolves to form a salt in the carrier solution. For example, the folowing tables indicate various components of test samples which may be extracted at an extraction of 100% by the carrier solutions indicated. The term X in the tables indicates the 100% extraction rate.

Electrolyte carrier solutions:

(1) 0.5 N acetic acid
(2) 0.5 N aqueous ammonium solution
(3) 0.1 N sodium hydroxide solution
(4) 0.1 N potassium hydroxide solution
(5) 0.05 M (tris-oxymethyl)amino methane+0.001 M NaCl
(6) 0.1 M $Na_2B_4O_7$

TABLE 1

| Organic acids (—COOH) | Electrolyte carrier solution | | |
| --- | --- | --- | --- |
|  | (1) | (2) | (3) |
| Acetylsalicylic acid |  | X | X |
| Nicotinic acid | X | X |  |
| Folic acid |  | X | X |

TABLE 2

| Aliphatic amines (—NH$_2$) | Electrolyte carrier solution (1) |
| --- | --- |
| Alimemazine | X |
| Chloropheniramine maleate | X |
| Acrinol | X |
| Acrinol-free base | X |
| Thiamine hydrochloride | X |
| Thiamine nitrate | X |
| Dihydrostreptomycine sulfate | X [1] |

[1] Acetic acid-sodium acetate buffer solution pH 6.0.

TABLE 3

| Cyclic amines | Electrolyte carrier solution (1) |
|---|---|
| Quinine hydrochloride | X |
| Quinine sulfate | X |
| Amino pyrine | X |
| Nicotineamide | X |
| Isoniazide | X |
| Pyridoxine hydrochloride | X |
| Carbazochrome | X |

TABLE 4

| Phosphates | Electrolyte carrier solution | | | |
|---|---|---|---|---|
| | (1) | (2) | (3) | (4) |
| Riboflavin phosphate | X | X | X | X |

TABLE 5

| Sulfonamides (—SONH—) | Electrolyte carrier solution | |
|---|---|---|
| | (1) | (2) |
| Sulfadiazine | X | X |
| Sulfisomidine | X | X |
| Sulfamonomethoxine | X | X |
| Sulfamine | X | X |
| Sulfadimethoxine | X | X |

TABLE 6

| Phenols | Electrolyte carrier solution (3) |
|---|---|
| Ethinyl estradiol | X |
| Salicylamide | X |

TABLE 7

| Chelate salt with sodium borate | Electrolyte carrier solution (5) |
|---|---|
| Rutin | X |
| Glucose | X |

TABLE 8

| Barbituric acids | Electrolyte carrier solution | | | |
|---|---|---|---|---|
| | (2) | (3) | (4) | (5) |
| Aminophylline | | X | | |
| Amobarbital | X | X | X | X |
| Cyclobarbital | X | X | X | X |
| Barbital | X | X | X | X |
| Phenobarbital | X | X | X | X |
| Hexobarbital | X | | | X |

TABLE 9

| Amino acids | Electrolyte carrier solution (1) |
|---|---|
| Glycine | X |
| Phenylalanine | X |

FIGS. 3 through 8 and FIG. 9 show other embodiments of the apparatus of the present invention. Like parts and components are designated by the same numerals as those shown in FIG. 1.

The arrangement illustrated further comprises an electrode inserting tube 12 disposed in communication with electrode vessel 3', a sample supply port 4a in sample chamber 4, which may be closed by a plug after it is filled with the sample and carrier solution, upper and lower covers 13, 13' made of metal covering the top and bottom of the respective electrode vessels 3 and 3'.

The method of the present invention may be as easily performed using this second apparatus embodiment as with the first apparatus embodiment. Although the method described above describes extracting in one direction from one electrode to the other, several components may be simultaneously extracted in both directions by one carrier solution. For example, two multistage separation chambers may be provided on both sides of sample chamber 4 (see FIG. 9) so that different components may be extracted in both directions at the same time. For example, in the case of the lactic acid salt of acrinol, if it is extracted by the apparatus shown in FIG. 9, lactic acid at a 100% extraction rate may be extracted at the upper or positive multistage separation chamber; simultaneously acrinol may be extracted at the lower chamber.

It is apparent from the foregoing description of the apparatus of this invention that an accurate extraction of a test component can be obtained from pharmaceutical preparations, biological specimens, crude drugs, etc.

The present invention also makes it possible to extract the same components by one carrier solution in different directions or two different components simultaneously.

What is claimed is:

1. An apparatus useful for the electroextraction of a component from a sample consisting essentially of:
   a D.C. power supply;
   a multistage separation chamber consisting essentially of at least two superimposed passages, each passage communicating in series with each adjacent passage and providing for a continuous flow of a liquid from the end of the first passage where said liquid enters said multistage separation chamber to the last passage from which said liquid exits from said multistage separation chamber;
   a sample chamber adjacent said last passage and separated therefrom by a first dialysis membrane permeable to said component being extracted;
   a first electrode disposed in a first vessel adjacent said sample chamber and separated therefrom by a second dialysis membrane;
   a second electrode disposed in a second vessel adjacent said first passage and separated therefrom by a third dialysis membrane; and
   said electrodes being electrically connected to said D.C. power supply enabling a D.C. voltage to be applied between said first and said second electrodes whereby said component being extracted from the sample contained in said sample chamber migrates through said first membrane into said last passage through which a carrier solution for said component being extracted is flowing, said multistage separation chamber having a sufficient number of communicating passages so that the component being extracted does not flow into said second vessel.

2. The apparatus of claim 1 further comprising a second multistage separation chamber disposed between said sample chamber and said first electrode and separated from both by dialysis membranes.

3. The apparatus of claim 1 further comprising means to continuously supply a solution to said apparatus.

4. The apparatus of claim 1 wherein said second electrode is disposed in a vessel separate from said apparatus but communicating with said multistage separation chamber.

References Cited
UNITED STATES PATENTS

| 2,636,852 | 4/1953 | Juda et al. | 204—151 |
| 2,799,644 | 7/1957 | Kollsman | 204—301 |
| 2,826,544 | 3/1958 | Dewey | 204—301 |
| 3,485,729 | 12/1969 | Hertz | 204—131 |

JOHN H. MACK, Primary Examiner

A. C. PRESCOTT, Assistant Examiner

U.S. Cl. X.R.

204—180 R, 180 P, 301